June 18, 1963 M. A. YOUNG 3,094,022

THREADED STUD EXTRACTOR TOOL

Filed May 19, 1961

INVENTOR.
MERRILL A. YOUNG
BY George M. Soule
ATTORNEY

United States Patent Office 3,094,022
Patented June 18, 1963

3,094,022
THREADED STUD EXTRACTOR TOOL
Merrill A. Young, Gates Mills, Ohio, assignor to Curtiss-Wright Corporation, a corporation of Delaware
Filed May 19, 1961, Ser. No. 111,286
4 Claims. (Cl. 81—53)

The removal of threaded studs (herein meaning headless bolts threaded on each end) from tightly threaded or "frozen" connection with supports, e.g., pipe flanges, engine cylinder heads, electrical generator core bars etc., has become a sufficiently difficult problem so that very few manufacturers of stud drivers adapted for insertion of studs offer tools under claim of operability as stud removers.

Studs, when frozen in place as mentioned, can be most easily and safely removed without essential damage, e.g., breaking off of the studs, by employment of impact torque providing such can be efficiently transmitted to the work. Presently available, usually complex and expensive, stud driving tools embodying self tightening toothed jaws or rollers, chucks, collets or wedges or which use some form of jam or lock nut devices have under extensive tests proven ineffectual when subjected to impact as against steady torque.

Stud drivers employing self-tightening grippers such as cam-roller type clutches or sprag or helical friction coil clutches are unsatisfactory if subjected to impact torque because too much of the kinetic energy involved in creating effectual impact has to be wasted in preparing the grippers for operation (clutch energization). Stud drivers requiring driving contact with a threaded portion of the stud invariably make such contact so far from the support than an importantly large percentage of the impact energy is wasted by torsional flexure of the stud.

The present solution to the above indicated problem is, from the standpoint of necessary equipment, very much simpler and less costly than presently available stud driving tools; reduces torque loss formerly due to torsional flexure of the overhanging or free end portions of the studs between their concealed threads and available points of application of torque to the studs; provides for imparting torque to the studs more effectually in a plurality of shear planes and otherwise so as to reduce or minimize liklihood of breakage of the studs during high impact torque application thereto, and, additionally, operates strongly to maintain desired (e.g., aligned) relationships between the axes of the studs and the axes of impact torque input applications.

The stud extractor body hereof uses, inter alia, the well established principle namely that a tubular driving extension for the output member of an impact wrench is far more efficient than a solid bar extension of comparable total effective cross section. A thick walled metal collar is integral with such tubular extension at its output end and the collar provides rigid radial support for at least two circumferential rows of set screws preferably having cup or hollow points such as will raise and trap under high compressive force the metal of the stud between regions of engagement of the individual set screws with the stud and distribute torque in comparatively wide bands or to a plurality of shear planes. The set screws of such plurality of rows are uniformly staggered and spaced apart approximately equal angular distances for equalization of torque application about the axis of the stud and usually through a total angular engagement therewith well over half of the entire circumference of the engaged portion of the stud. Thereby when the set screws are firmly driven against the stud the tubular drive extension is strongly aligned with or fixed in approximately parallel relationship to the stud, and the region of the stud between the two rows (or several rows if desired) of set screws is rendered as torsionally rigid as the set screw-supporting collar which can be designed to have substantially zero flexure under the involved impact forces.

Objects and advantages of the invention not indicated above will be brought out in connection with the following description of a preferred or suitable arrangement.

Figure 1:
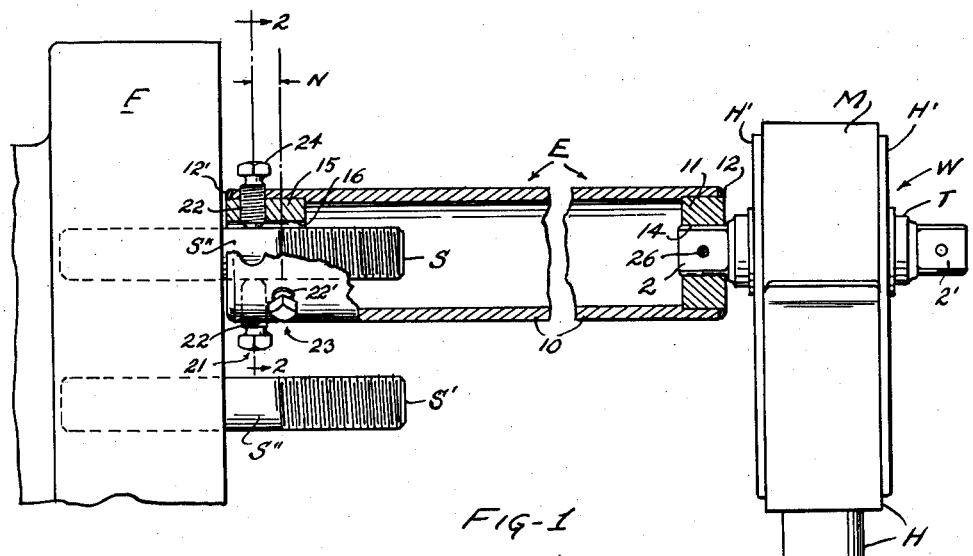
FIG. 1 is a more or less diagrammatic plan and partially central sectional view showing two studs, their common support, the stud extractor mechanism unit hereof and, in elevation, portions of a manual impact wrench of known construction.

In FIG. 1 two studs S and S' of conventional form are shown as though threaded into a rigid support F projecting therefrom in parallel relationship and at such distance apart as is typical of studs on the flange of a pipe. The studs usually have unthreaded mid portions S''. Studs in most installations have their longitudinal axes spaced apart at least three stud diameter spaces, thus allowing plenty of room for the preferred easily manipulated form of stud gripping set screws as will be described.

The extractor tool assembly or unit E has a tubular torsionally rigid body 10 which is preferably a steel tube of butt welded or other substantially seamless construction, and in the case of studs no larger than approximately one inch in diameter would have, for example, a wall thickness of approximately .250", a length of from 8" to 12" and an outside diameter of approximately 2". A torque-input-receiving plug 11 is suitably secured as by conventional, V-type welding at 12 into the tube 10. The plug 11 has suitable conformation to mate with the output portion of impact wrench W (described later), the conformation for example being a generally square hole 14 through the plug 11 if the wrench W has drive squares such as 2 and 2', FIG. 1.

Figure 2:
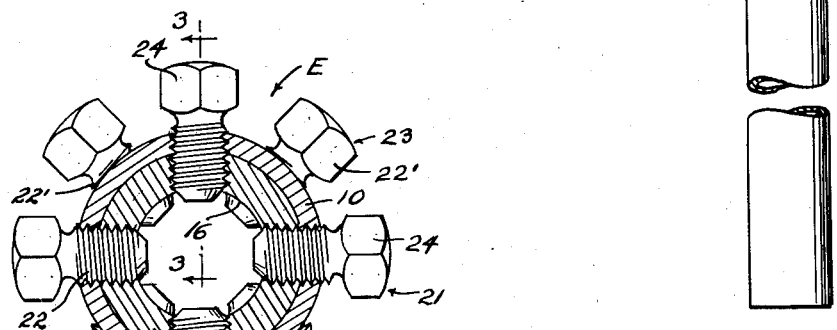
FIG. 2 is a cross-sectional detail view taken as indicated by the line 2—2 on FIG. 1.

At the output end of tubular body 10 is an annular tough metal plug 15 somewhat longer than plug 11 and shown as integrally secured in the tubular body 10 by welding at 12'. The plug 15 has a circular bore or hole 16 through it slightly larger than the largest of several sizes of stud to be accommodated by the extractor tool assembly E. The gripping and driving means for the stud additionally comprises as shown by comparison of FIGS. 1 and 2 a row 21 of conventionally hardened set screws 22 and another row 23 of identical or similar set screws 22'. In the size of extractor unit referred to above, hole 16 is slightly larger than one inch in diameter and the set screws preferably have one half inch pitch diameters.

The set screws 22 and 22' of the respective rows 21 and 23 are equally angularly spaced about the axis of the body 10 (as with 90 degrees angular spacing if four screws are employed per row) and the screws of the two rows are in medial angularly offset and staggered relationship so that torque is applied to the stud all around it at short intervals.

The rows 21 and 23 of set screws, solely in order to minimize marring of exposed stud threads, are preferably spaced apart as indicated by dimension N, FIG. 1, a distance in the magnitude of the pitch diameters of the screws. Thereby the collar 15 and adjacent body tube wall can have relatively small mass and length without sacrifice of torsional rigidity. As is evident from FIG.

2, the screw spacing in row 21 leaves plenty of wall strength. Additionally, assuming the screws are set from positions bearing lightly against associated perimetral surfaces of the stud S into uniformly indenting relationship to the stud, the stud will be effectual to hold the tubular body 10 of the extractor tool parallel to the stud and projecting therefrom as a strong cantilever adequately to support the wrench W in operation. Alignment of the axes of the work (stud) and the tool E is desirable, but unnecessary in order to conserve torque output of the impact wrench W since its output is purely torque and the entire wrench is free to move orbitally.

Figures 3, 4:
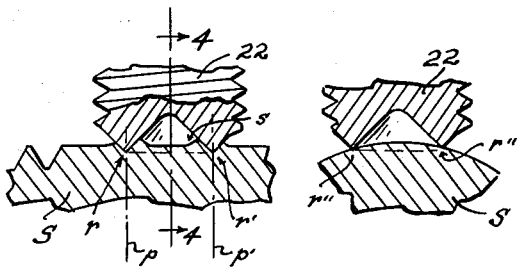
FIG. 3 is an enlarged cross-sectional fragmentary view taken as at line 3—3 on FIG. 2 showing the preferred manner of applying gripping and turning forces to the stud.
FIG. 4 is a view similar to FIG. 3 taken at right angles thereto as indicated on FIG. 3.

For the purpose, inter alia, of effectually distributing the turning forces applied by the set screws 22 and 22' in a plurality of transverse planes at each row of set screws conventional cup or hollow "points" on the screws usually engage the work approximately as shown by comparison of FIGS. 3 and 4. In FIG. 3, the depicted stud portion is cut longitudinally, and the screw-applied torque is concentrated at regions or areas $r$ and $r'$ of the stud along associated transverse force concentration planes $p$ and $p'$ because diametrically opposed areas of the cup "points" indent the stud deeper as viewed in FIG. 3 than can the diametrically intermediate regions $r''$ as in FIG. 4. In practice the regions $r''$ seldom have to be driven into contact with the stud in order to transmit the necessary torque. The screws are driven in forcibly enough so that, around and adjacent each region $r$ and $r'$ FIG. 3, the metal of the stud is raised radially and trapped within the cup end of each screw as at $s$.

The set screws 22 and 22' preferably have more or less conventional square type heads 24 (sometimes reduced axially) particularly if the studs S and S' are no closer together than as already indicated. If necessary the set screws can be "headless" as by having polygonal sockets for wrench engagement.

By the use of impact wrenches W of smaller size range than the one used to extract the studs S and S' the set screws can, through counting high-torque-opposed impacts which are audibly recognizable, be very quickly and precisely forced into uniform indenting and extruding contact with the stud. If the smooth portion S'' of the stud is quite limited axially then part of the set screws will engage the exposed threads. Marring of exposed stud threads is unimportant since the extracted studs are considered economically expendable, being usually replaced by new ones.

The manual impact wrench W, as partially illustrated in FIG. 1, represents one being sold by the assignee hereof under the registered trademark Swench. Its construction and operation is fully described in U.S. Pat. 2,954,714 issued October 4, 1960 to Oscar J. Swenson. Wrench W has a handle unit H, side plates H' of which coaxially support for relative angular movement as on bushings not shown integral with the handle unit, the output spindle or tool head T and an inertia member or unit assembly M of generally cylindrical form. The conventionally squared extremities 2 and 2' of spindle T are designed to fit into complementary openings of standard wrench sockets or adapters not shown thereby fitting the square sockets 14 in plug 11 FIG. 1. The drive squares 2 and 2' and associated components vary in size according to diameters of the threaded portions of the studs S and S' or other work as do the extractor units E hereof according to established duty range rating.

In the operation of the impact wrench W to extract studs such as S and S', assuming these have right hand threads, wrench output square 2 is inserted and may be suitably detachably pinned in place at 2c in the opening or socket 14 of plug 11. From a view point of axis L to the right of FIG. 1 rotation of the extractor tool E will be counterclockwise. Drive square 2' of the impact wrench will be engaged with plug 11 for stud replacement and, when the tool E is used for screwing in of studs, it is unnecessary to engage the studs with more than the set screws of the axially outermost row (21). Thus no damage need be done to any useful threads of the replacement studs.

The tool head of spindle T is operated pursuant to predetermined indexing or successive unidirectional angular movements of handle unit H about the axis L of tool head T to cause the inertia member or unit M (via ratchet pawls carried by the inertia member and operated by power spring and cam means not shown) to deliver a succession of sharp hammering blows to ratchet teeth, not shown, formed on and around the spindle or tool head T. The operation is essentially one of successive or alternate escapements and impacts of the pawls and the teeth of the tool head T until the concealed threads of the stud are loosened. Usually due to especially high interference fitting between the threaded openings of the support and the stud threads a fairly large number of impacts may have to be given to the studs before they can be turned freely as by an ordinary bar wrench or simple ratchet wrench engaged in the socket 14 of the extractor tool E. A crank, not shown, applied to exposed drive square 2' can be used economically to spin out the stud when it has become sufficiently loose.

I claim:

1. For operation by a torque transmitting output member of an impact wrench mechanism on a screw threaded stud to be extracted from threaded position in a support and having a free end portion projecting from the support, a substantially torsionally rigid unitary metal extractor body operatingly connected to receive impact torque from said output member and having an annular wall portion around and radially close to the projecting portion of the stud and disposed in close proximity to the support, and at least two rows of approximately equiangularly spaced and radially extending set screws in snug threaded engagement with complementary openings through the annular wall portion and having inner cup-pointed ends tightly seated in indenting relationship to respective peripheral surface portions of the stud, said rows being spaced apart axially of the annular wall portion of the body a distance in the magnitude of the pitch diameters of the screws, the set screws in one row being approximately equiangularly spaced from the screws in an adjacent row about the central axis of the annular wall portion.

2. A stud extractor according to claim 1 wherein the set screws, when in full indenting engagement with the largest diameter stud that can be received in the bore of the annular wall portion, make such indenting engagement through angles having a total of materially greater than half a complete circumference.

3. A stud extractor for use between an output member of an impact wrench and a screw threaded stud to be extracted from mounted position in and having a portion projecting from a support: comprising an elongated substantially torsionally rigid metal body, one end of the body having means to receive impact torque from such output member and its other end having an annular wall portion operatingly rigid therewith adapted to surround the projecting portion of the stud, and a plurality of circumferentially extending rows of hollow or cup pointed set screws snugly occupying respective generally radial equiangularly spaced apart threaded openings in said annular wall portion, the openings of each row being equiangularly spaced from correspondingly disposed openings of an adjacent row, whereby the set screws can be driven into approximately uniform indenting contact with the stud in a manner holding the extractor body strongly in alignment or parallel relationship with the stud for application of torsional stud-extracting force via the set screws.

4. A stud extractor for use between an output member of an impact wrench and a screw threaded stud to be extracted from mounted position in and having a portion projecting from a support: comprising a tubular substantially torsionally rigid elongated metal body, means at one end of said body to receive impact torque from such output member, the other end of said body having an annular wall portion of increased radial thickness operatingly rigid therewith adapted to surround the projecting portion of the stud close to said support, and a plurality of circumferentially extending rows of hollow or cup pointed set screws snugly occupying respective generally radial equiangularly spaced apart and uniformly staggered threaded openings in said annular wall portion, the openings of each row being equiangularly spaced from correspondingly disposed openings of another row whereby, when all the set screws are driven into approximately uniform indenting contact with respective peripheral surface regions of the stud, the extractor body will be strongly held approximately in axial alignment with the stud, and torsionally applied forces tending to shear the stud will be applied thereto all around the stud and in a greater number of transverse planes than there are rows of set screws.

References Cited in the file of this patent
UNITED STATES PATENTS

| | | |
|---|---|---|
| 1,168,068 | Harrison | Jan. 11, 1916 |
| 1,733,355 | Morse | Oct. 29, 1929 |
| 2,381,498 | Iverson | Aug. 7, 1945 |
| 2,632,350 | Kaster | Mar. 24, 1953 |
| 2,961,905 | Stumpf | Nov. 29, 1960 |